Oct. 28, 1924.

I. H. DRIGGS

AEROPLANE

Filed Oct. 6, 1921

Witnesses:
A. K. Lee
L. H. Emrick

Inventor-
Ivan H. Driggs
Ralph H. Chilton
Attorney

By

Oct. 28, 1924.

I. H. DRIGGS

AEROPLANE

Filed Oct. 6, 1921

Witnesses:
R. Klee
L. H. Emrick

Inventor
Ivan H. Driggs
By Ralph H. Chilton
Attorney

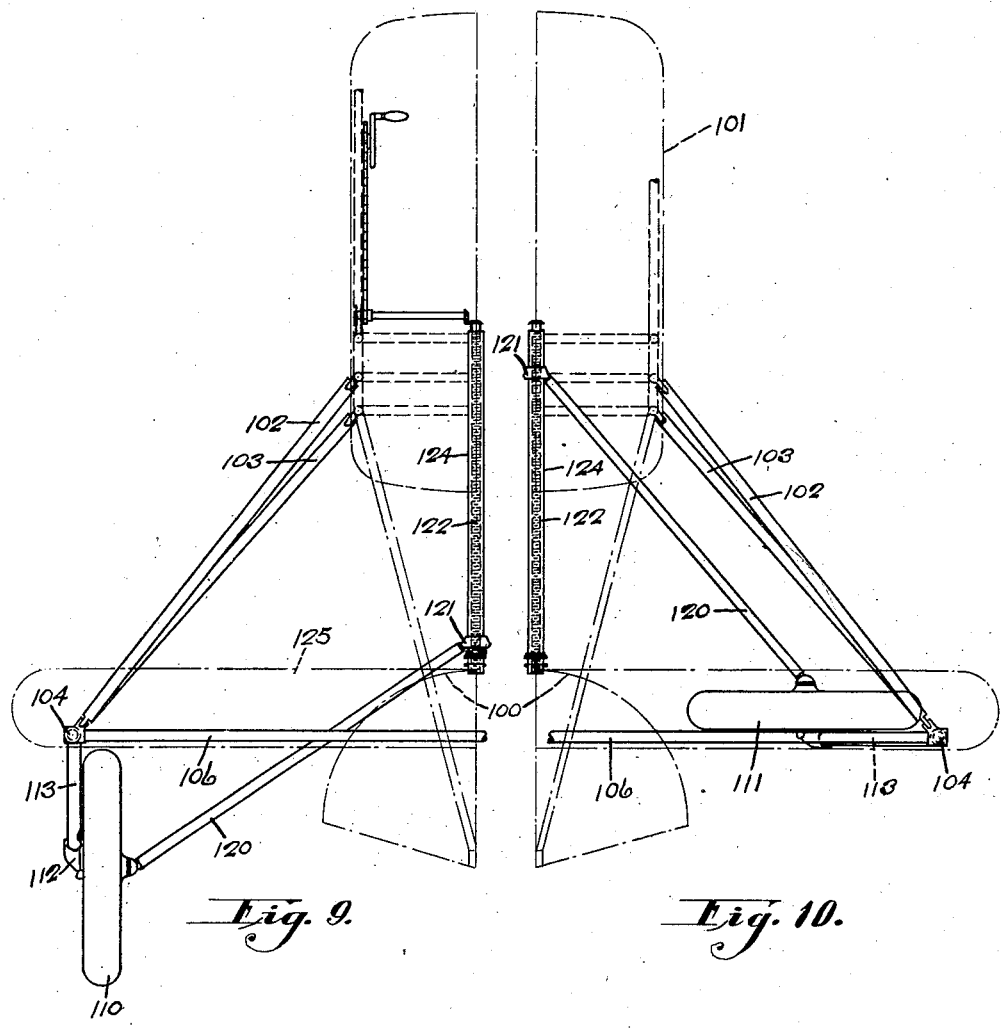

Patented Oct. 28, 1924.

1,512,912

UNITED STATES PATENT OFFICE.

IVAN H. DRIGGS, OF DAYTON, OHIO, ASSIGNOR TO DAYTON-WRIGHT COMPANY, OF DAYTON, OHIO, A CORPORATION OF DELAWARE.

AEROPLANE.

Application filed October 6, 1921. Serial No. 505,799.

*To all whom it may concern:*

Be it known that I, IVAN H. DRIGGS, a citizen of the United States of America, residing at Dayton, county of Montgomery, and State of Ohio, have invented certain new and useful Improvements in Aeroplanes (docket #26), of which the following is a full, clear, and exact description.

This invention relates to improvements in airplanes and has as a general object the design of a plane which is capable of landing either on the water or land. Such planes are especially desirable for use in the Navy since they can be carried out to sea on shipboard and at any desired time can "take-off" from the ship or land safely thereon. Also they can land safely on the water at any time and hence are free from the dangers of forced landings which are always present when land planes are flown from a ship, or when conditions are such that a landing cannot be made on shipboard.

Among the objects of this invention is the provision of a retractile landing gear which can be drawn up, during flight or when landing on water, within an aerofoil-shaped housing. Thus the air resistance of the landing wheels is eliminated while the aerofoil-shaped housing gives considerable lift thereby permitting a reduction in the wing area.

Another object of this invention is to provide a novel, simple, and efficient design of wing bracing.

Further objects and advantages of the present invention will be apparent from the following description, reference being had to the accompanying drawings, wherein a preferred form of embodiment of the present invention is clearly shown.

In the drawings:

Figs. 6, 7, 8, 9 and 10 illustrate a modification wherein the landing gear is applied to a single pontoon hydroplane, Fig. 6, being a front elevation of the machine.

Fig. 7 is a side elevation of the machine.

Fig. 8 is a detail view on an enlarged scale showing a side elevation of the retracting mechanism.

Fig. 9 is a front elevation of the left half of the retracting mechanism with the wheel in fully extended position.

Fig. 10 is a front elevation of the right side of the retracting mechanism with the wheel in its retracted position.

In the drawings similar reference characters refer to similar parts throughout the several views.

Numeral 11 represents the main body or fuselage of the hydroplane of Figs. 1, 2, 3, 4 and 5; 12 is the engine, 13 the propeller, 14 the rudder, 15 the elevators, 16 the vertical fin, and 17 the horizontal stabilizer.

These parts form no part of the invention of this application and hence are not described in detail herein.

Figure 1:
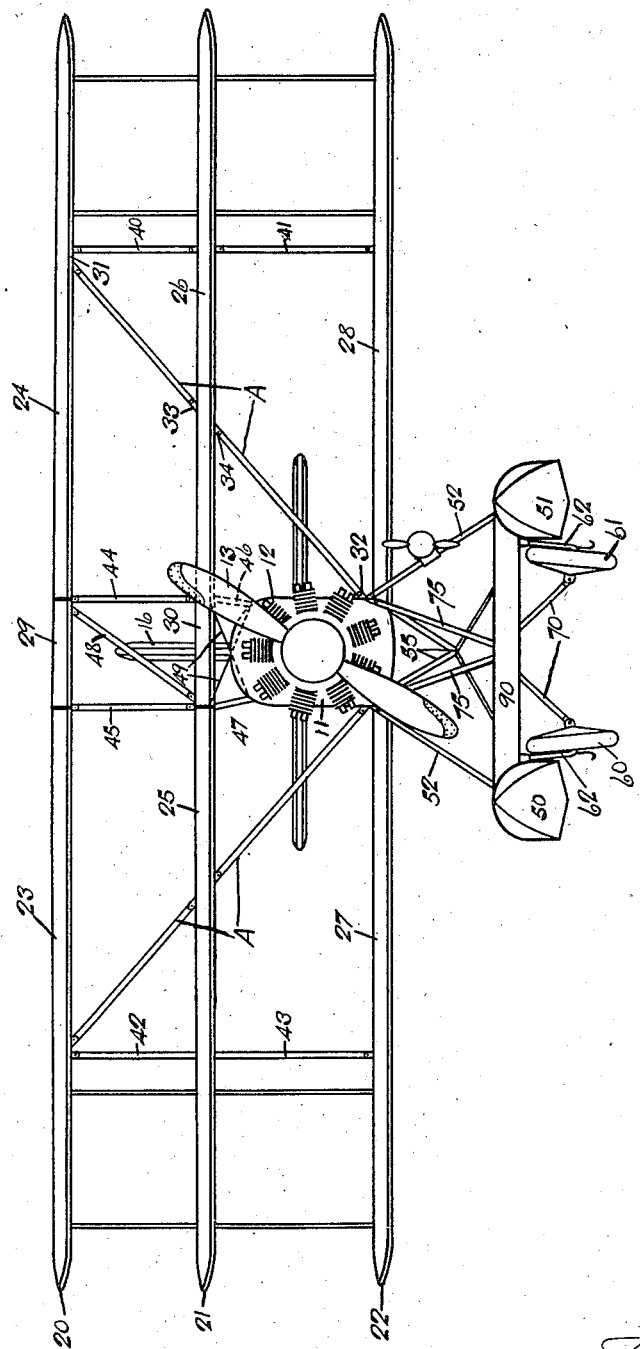
Fig. 1 is a front elevation of a double pontoon hydroplane with the landing wheels in extended position.

This invention however does embrace the novel method of trussing the wings of the triplane shown in Figs. 1, 2 and 3, which will now be described.

The upper plane 20 of the triplane is formed of the two panels 23 and 24 hinged on the center section 29, while the intermediate plane 21 is similarly formed of the two wing panels 25 and 26 and the center section 30. The lower plane 22 is formed of the two wings 27 and 28 hinged to the fuselage.

The wing trussing comprises the diagonal strut "A" extending from the rear outer strut point 31 of the upper wing to the point 32 on the body back of the motor. The center line of this strut "A" passes through the center line of the front spar of the intermediate plane and is cut there and pin jointed to the spar on the top at 33 and on the bottom at 34. (See Figs. 1 and 3.) Another diagonal strut "B" extends from the front outer strut point 35 of the upper wing to the lower wing front spar attachment 36 at the body. (See Figs. 2 and 3.) This strut "B" lies entirely in the plane of the front wing spars and hence its center line passes through the intermediate wing spar at the same point as strut "A" does. Strut "B" is likewise cut at the intermediate plane and pin jointed to the spar at the points 37 and 38 in a manner similar to strut "A". The wing trussing is completed by the N struts 40, 41, 42, and 43 at the wing ends and the N struts 44, 45, 46, and 47 at the center section. Preferably the center section is braced between the top and intermediate wings by the diagonal braces 48 at both the front and rear struts and between the intermediate wing and fuselage by the cross wires 49. The N struts are all pin jointed throughout as well as the diagonal struts "A" and "B". Preferably these struts are all made from steel tubes with stream line faring attached thereto, but of course other material may be used if desired provided such material is suitable for tension as well as compressive stresses.

In flight it will be seen that the two lift struts "A" and "B" act together to take the lift, the major portion of the lift falling upon one or the other dependent upon the position of the center of pressure. In Fig. 2 of the drawings $R_2$ represents roughly the direction of the resultant wind pressure at high angles of incidence, while $R_1$ represents the resultant pressure at low angles of incidence and high speeds. It is thus seen that for all flying angles of incidence the direction of the resultant air pressure falls within, or even in extreme cases nearly within, the angle made by the struts "A" and "B" (as seen from Fig. 2) and hence these struts brace each other in taking care of the drift forces, that is, the drift components in the two struts "A" and "B" oppose each other in direction and hence partially or entirely cancel one another.

Figure 2:
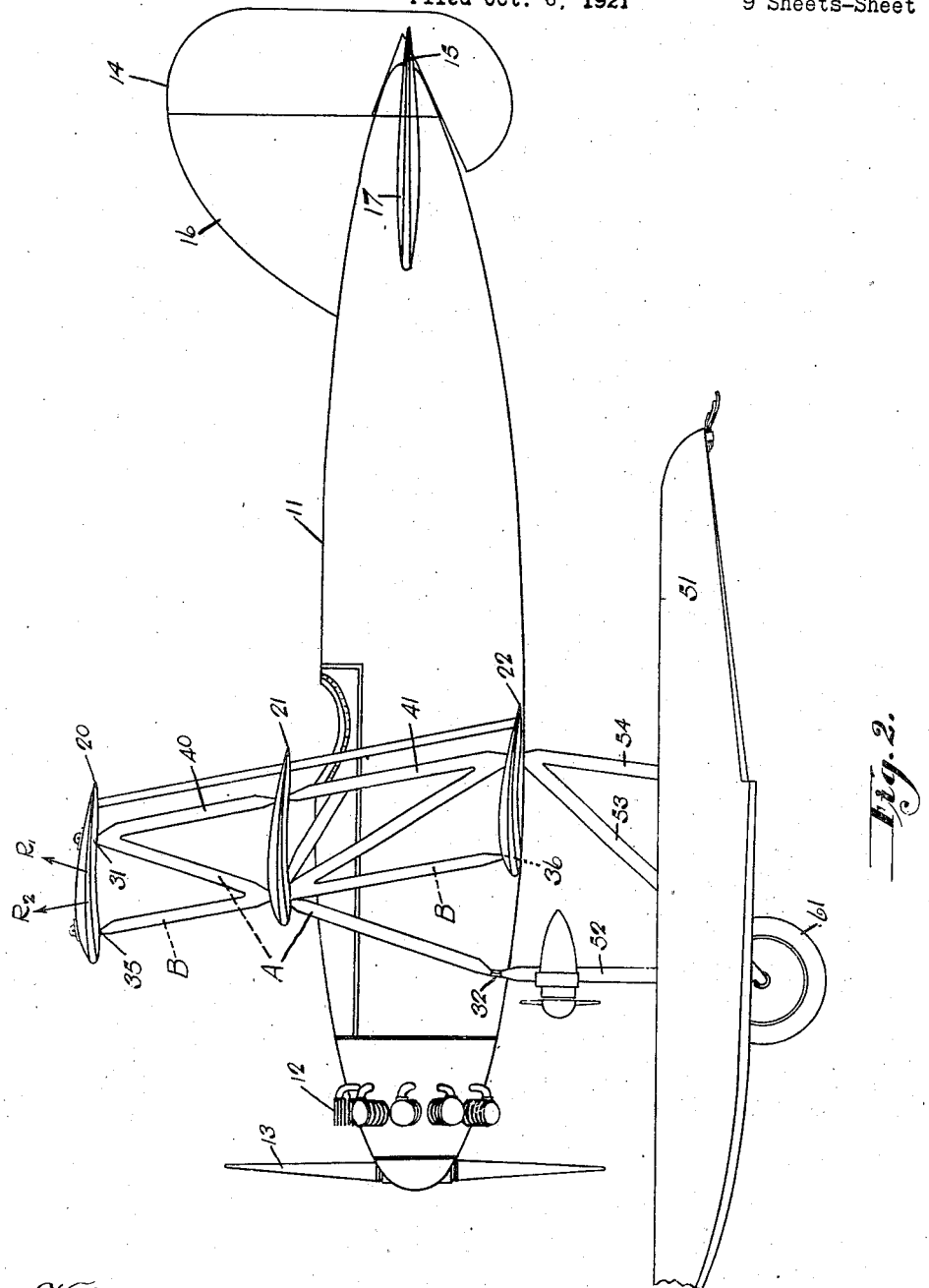
Fig. 2 is a side elevation of the machine of Fig. 1.
Figure 3:
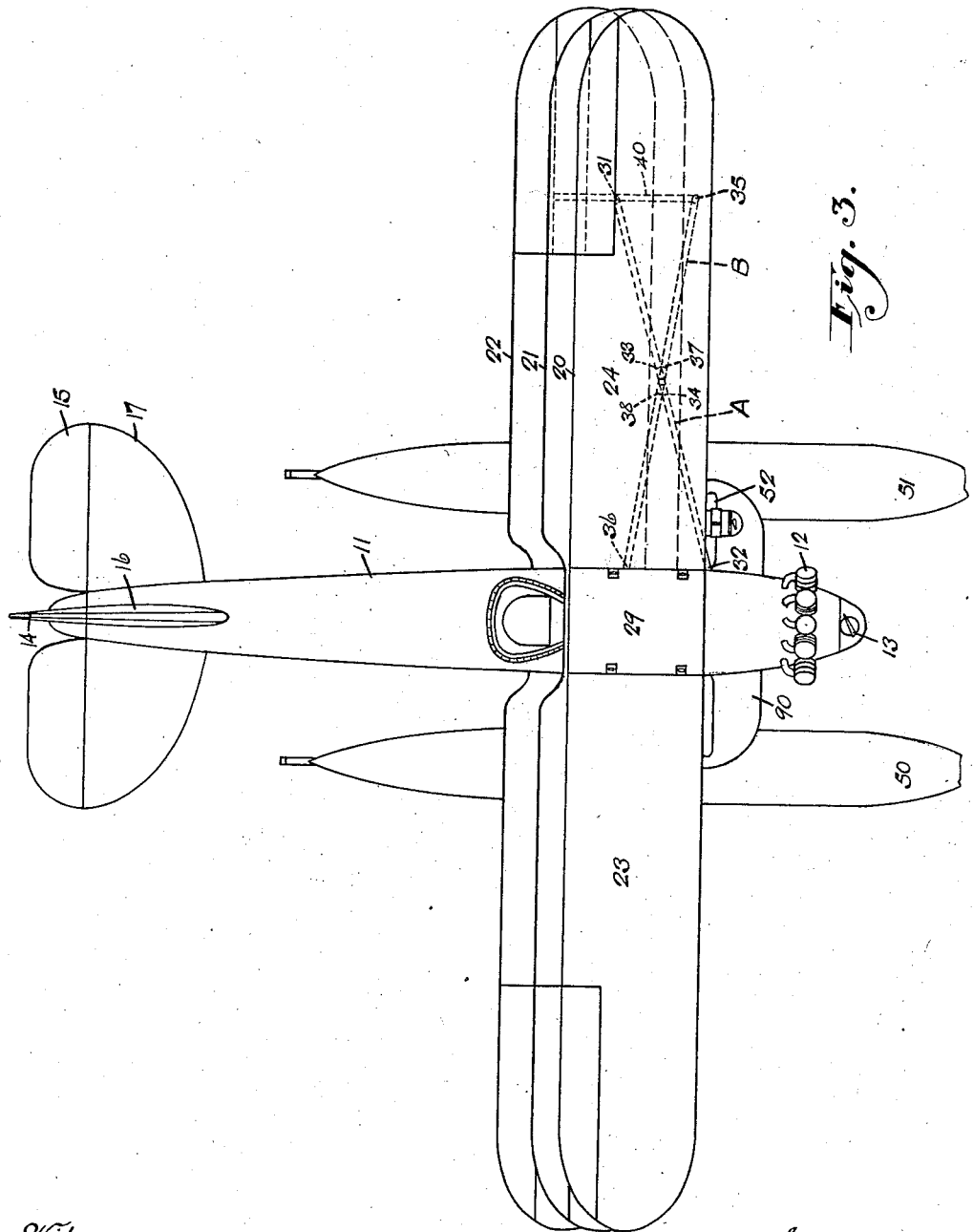
Fig. 3 is a plan view.

A further advantage of this arrangement lies in the fact that at low angles of incidence the resultant $R_1$ is displaced along the wing chord nearer strut "A" while at high angles of incidence the resultant $R_2$ lies nearer strut "B" (as shown in Fig. 2). Thus it is seen that the strut carrying the greatest load at any given time will be more nearly under direct tension, which fact, of course, also reduces the forces carried by the other brace members.

The retractile landing gear will now be described. The two pontoons 50 and 51 are rigidly braced to the body of the machine by means of struts 52, 53, 54 and the cross bracing represented generally by reference number 55. The landing wheels 60, 61 are supported on rigid triangular frames composed of members 62, 63 and 64. The vertical members 62 and 63 of this rigid frame are slotted immediately under the cross member 64 as shown at 65 and 66 respectively, and the entire frame and wheel is supported by the stationary tube 67 rigidly attached to the fittings 68 and 69 at the base of struts 52 and 53 respectively. This tube 67 extends through the slots 65 and 66 and is bound to the triangular frame member 64 by elastic shock absorber cord 74, as clearly shown in Fig. 4.

The inner end of the wheel axle is pinned to the link 70, the other end of the link being pinned to the nut 71, which may travel along the long screw 72. The upward force on link 70 due to landing is taken chiefly by a V bracing composed of two struts 75 which extend from the fuselage and are rigidly attached at the point of the V. The nut 71 has an extension guide 73 (see Fig. 4) which rides on the strut 75 and to which the link 70 is pinned, so that link 70 will be in alignment with strut 75 at all times to enable the landing forces to be better transmitted to the V bracing. This construction permits the use of a very small and light screw 72.

The two screws 72 are operated by bevel gears 80 which may, if desired, be enclosed in a gear box 81 and be packed with grease to ensure smooth operation of the mechanism. The cross shaft 82 may be operated by any desirable means. Preferably it is operated by means of a small hand crank 83 conveniently located with reference to the pilot's seat and the motion transmitted to the shaft 82 by means of a friction belt or chain 84 running over pulleys or sprockets 85 and 86. The speed of raising or lowering the landing wheels may be easily fixed at any desired rate by the gear ratio of pulleys or sprockets 85 and 86.

Figure 4:
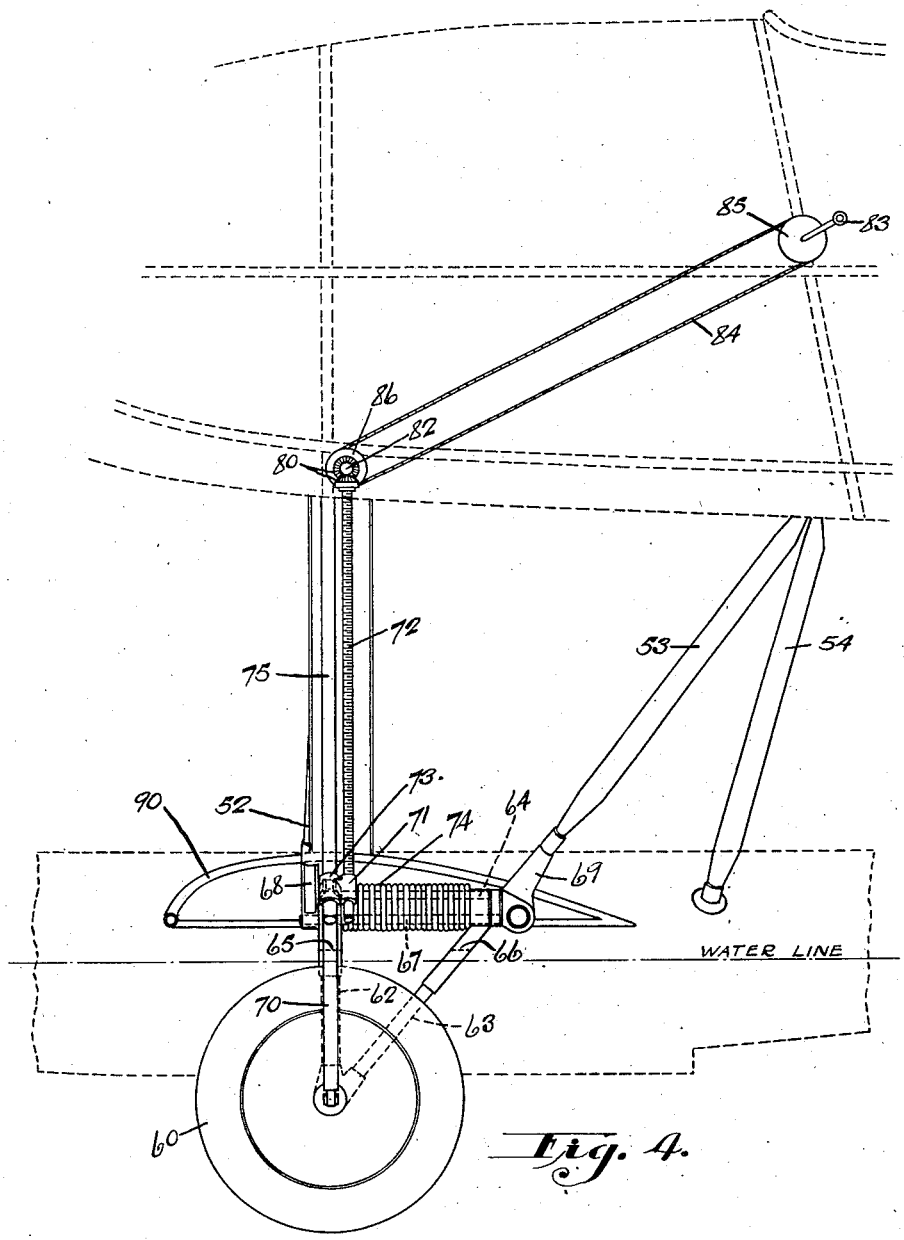
Fig. 4 is a detail view on an enlarged scale showing the mechanism for retracting the wheels, parts of the fuselage and pontoon being shown in dotted lines.
Figure 5:
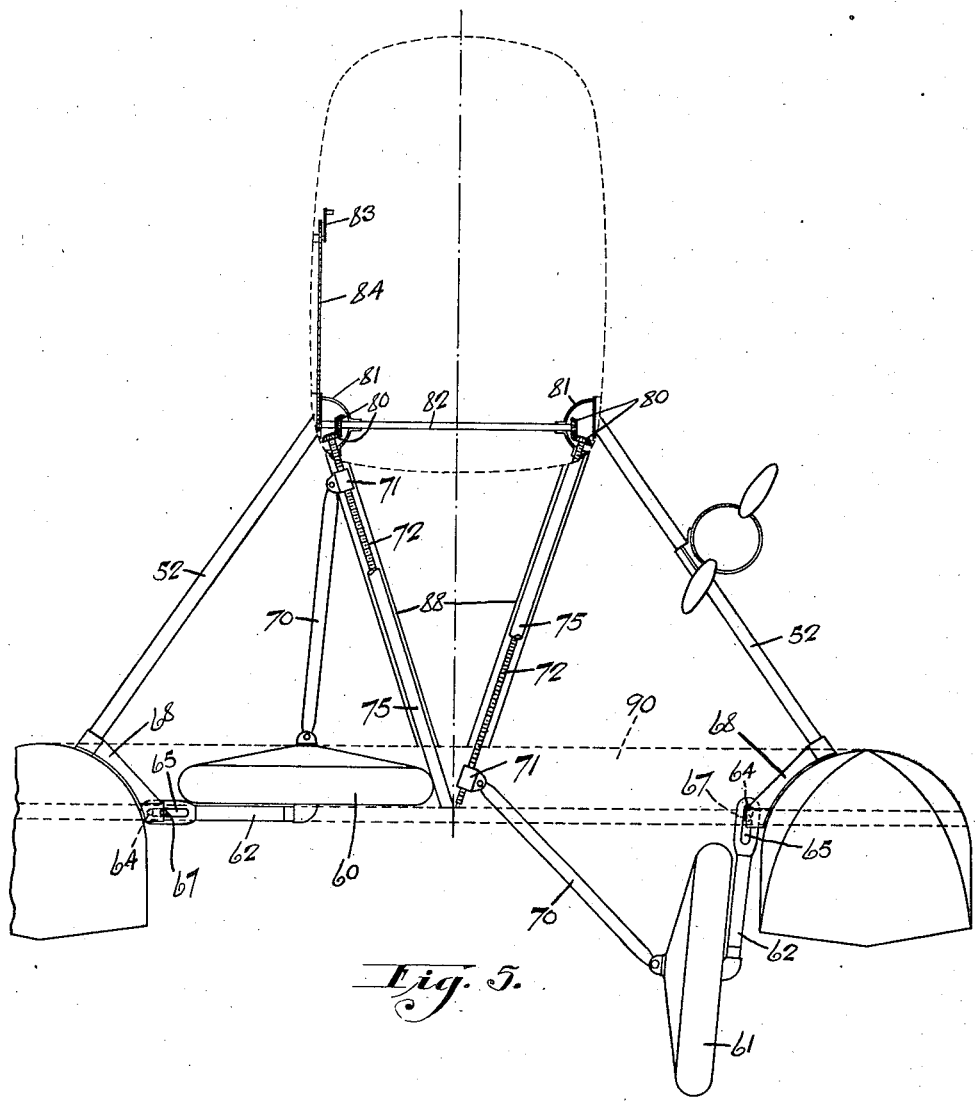
Fig. 5 is a composite view showing the retracting mechanism, the left hand side showing a wheel in its retracted position within the aerofoil housing, while the right hand side shows a wheel in its fully extended position.

An aerofoil housing 90 is constructed between the two pontoons so that the wheels fit snugly within same when in raised position as clearly shown in the left side of Fig. 5. This housing may be of any suitable aerofoil section, such as U. S. T. S. No. 9, which while offering some drag gives considerable lift and thereby allows a reduction of wing area. The housing is so positioned with relation to the pontoons, that, when the airplane is on the water, it is entirely above the water line, as shown in Fig. 4.

The V struts 75 and the screws 72 are preferably enclosed by a stream line housing 88 as shown in Figs. 4 and 5. It is thus seen that no parts of the mechanism is immersed when on the water and the screws 72 are well protected from the spray by the housing 88.

The modification shown in Figs. 6 to 10 inclusive will now be described. These figures show an adaptation of the combination landing gear to a hydroplane of the single pontoon type.

Figure 6:
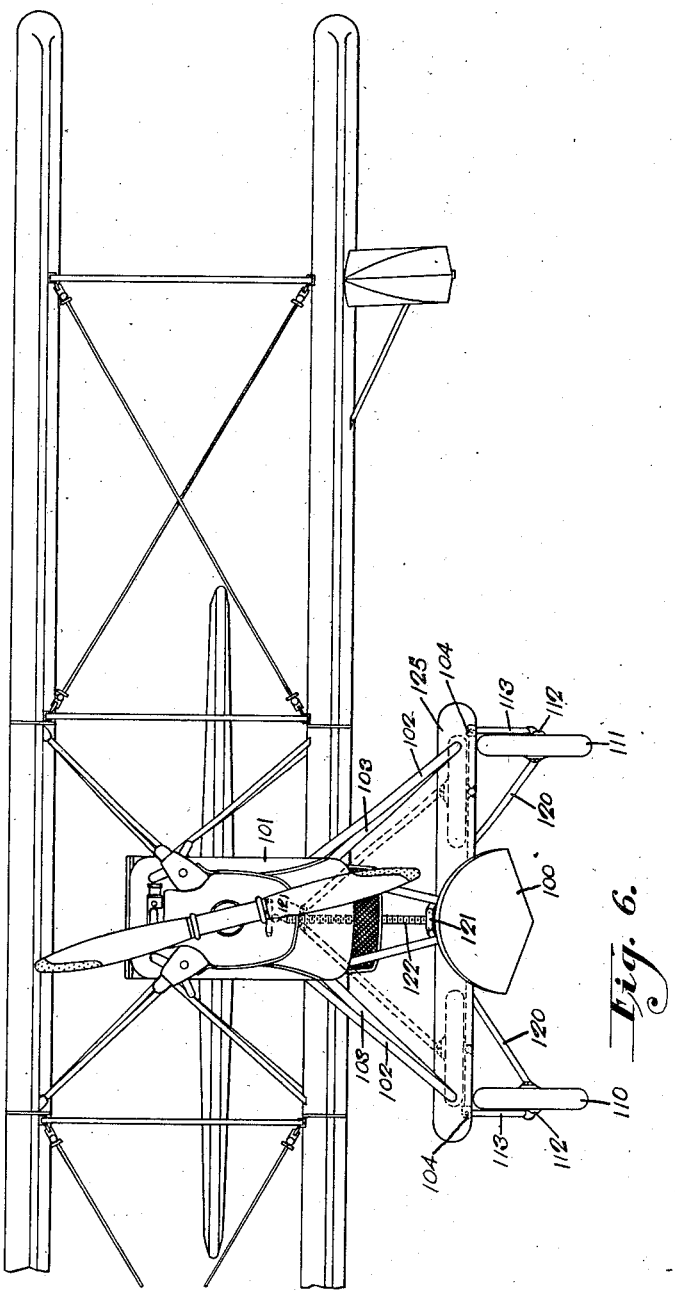
Figure 8:
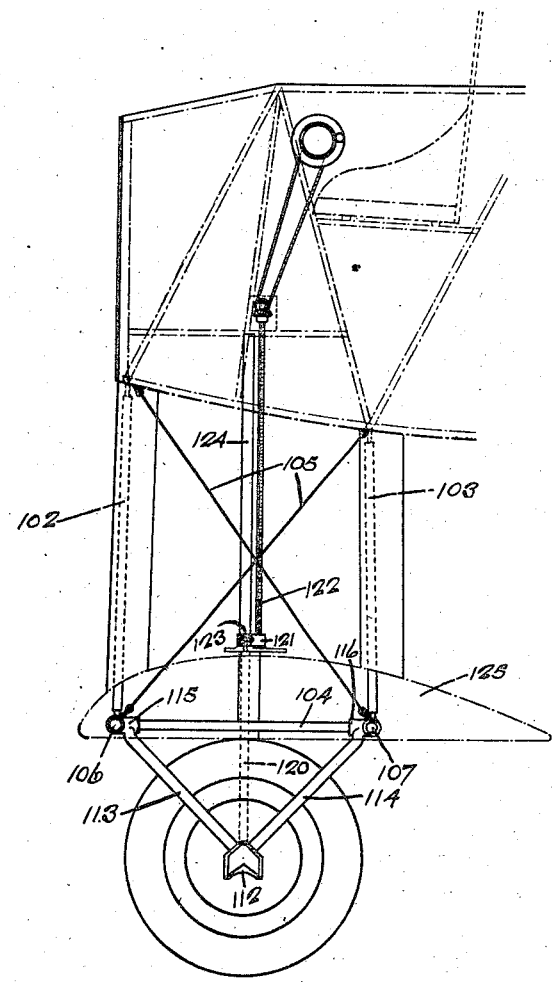

In Fig. 6 the single pontoon 100, is braced rigidly to the fuselage 101 by any arrangement of struts desired and since the particular manner in which it is braced forms no part of this invention it will not be described in detail. The wheel landing gear frame comprises the upwardly inclined struts 102 and 103 and the horizontal member 104 braced by the cross wires 105, and the transverse members 106 and 107 (see Figs. 8 and 9). These members are all pin jointed as usual and the upright struts 102, 103 are preferably stream lined as shown in Fig. 8. The wheels 110 and 111 are carried on an axle supported by strut members 113 and 114 which are held rigid relative to each other by the fitting 112, and which are pivoted upon the cross member 104 at the points 115, 116 (see Fig. 8). Thus it is seen that the wheel with its supporting frame may be revolved about the center line of member 104 (see Figs. 9 and 10). The inner ends of the wheel axles are pivoted to links 120 whose opposite ends are pivoted on opposite sides of the nut 121 which travels on the central vertical screw 122. The nut 121 has an extension guide 123 which rides up and down on the vertical member 124 rigidly fastened between the pontoon 100 and the fuselage. Preferably this upright member 124 is a steel tube and also constitutes one of the struts for supporting the fuselage upon the pontoon. Since the side thrust on links 120 will be equal and opposite there will be no side thrust on the strut 124. Since the plane of the struts 113 and 114 is approximately vertical and close up to the plane of the wheel when the wheels are in landing position (see Fig. 9), there will be little if any upward force on the nut 121 and hence the screw 122 may be quite small and light. The screw 122 may be operated by a hand crank as previously described in the case of the double pontoon arrangement.

The aerofoil housing 125 preferably is supported upon the transverse members 106 and 107 since these are in position to aptly lend themselves to such construction as seen from Fig. 8.

Figure 7:
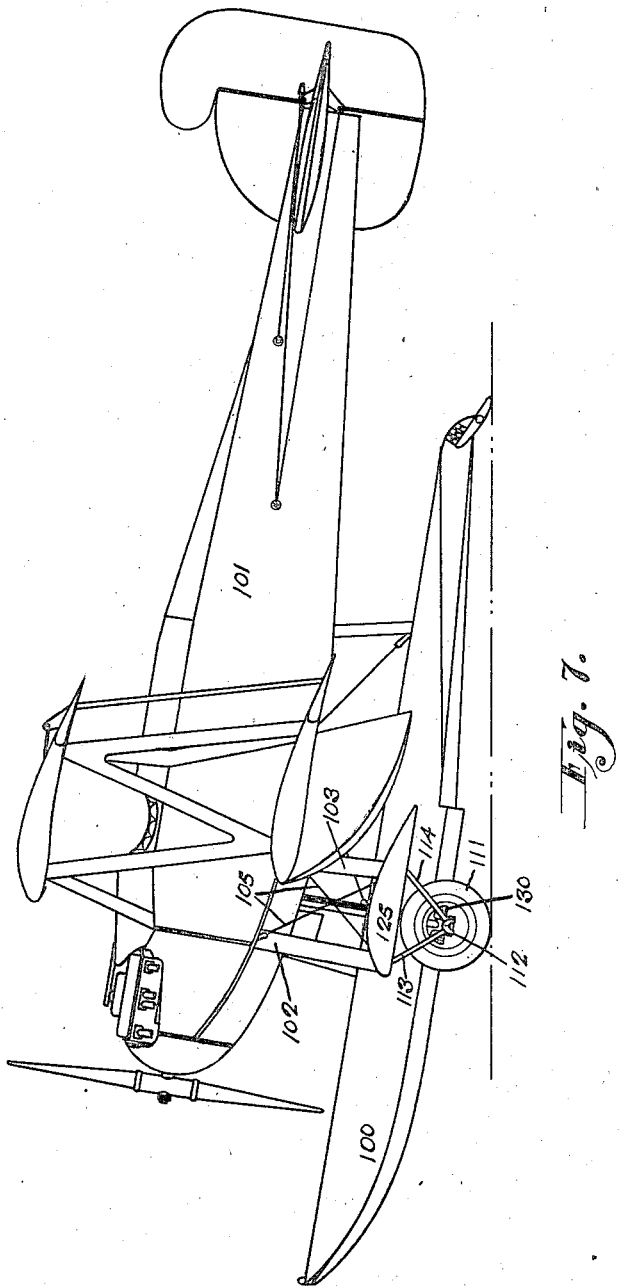

The shock absorbers used on the design shown are placed within the dished wheels as shown at 130 (Fig. 7). Of course, the ordinary wheels and elastic cord shock absorbers could be used if desired, but in this event it would be desirable to bend the struts 113, 114 so that pivots 115, 116 would lie vertically above the center line of the wheel and thus eliminate all upward force on links 120.

While the form of mechanism herein shown and described, constitutes a preferred form of embodiment of the present invention, it is to be understood that other forms might be adopted, all coming within the scope of the claims which follow.

What I claim is as follows:

1. An airplane having a rigid non-retractable landing chassis frame located centrally thereof, a landing pontoon rigidly attached to said frame for landing on water, wheel supports pivotally mounted upon said frame independently of said pontoon and spaced therefrom, landing wheels mounted upon said supports and extendable below said pontoon for landing on land, and means for raising said wheels and wheel supports toward the non-retractable frame to a position above the water line on the pontoon.

2. An airplane having a rigid non-retractable landing chassis frame located centrally thereof, a landing pantoon rigidly attached to said frame for landing on water, wheel supports pivotally mounted upon said frame independently of said pontoon and spaced therefrom and pivoted about a fore and aft axis, landing wheels mounted upon said supports and extendable below said pontoon for landing on land, and means for revolving said wheel supports laterally about said fore and aft axis to raise said wheels and supports above the water line on the pontoon.

3. An amphibian airplane having a non-retractable landing chassis frame, a non-retractable landing pontoon rigidly mounted upon said frame for landing on water, retractable landing wheels retractably mounted upon said chassis frame at points independent of and distant from said pontoon, whereby said wheels may be extended below said pontoon for landing on land or withdrawn toward said chassis frame to a point above the water line on said pontoon.

4. An amphibian airplane having a non-retractable landing chassis frame, a non-retractable landing pontoon rigidly mounted upon said frame for landing on water, retractable landing wheels retractably mounted upon said chassis frame at points independent of and distant from said pontoon, whereby said wheels may be extended below said pontoon for landing on land or withdrawn toward said chassis frame to a point above the water line on said pontoon, and an auxiliary lifting aerofoil rigidly mounted upon said chassis frame and adapted to house said wheels when in retracted position.

5. An airplane having float means spaced an appreciable distance below the lower wings thereof for landing on water, and in addition thereto retractile means for landing on land, and an auxiliary lifting aerofoil positioned above the water line on said float means and adapted to house the retractile means when in retracted position, whereby the total drag is decreased and the left increased.

6. An airplane having float means for landing on water, and in addition thereto retractile means for landing on land, and an auxiliary lifting aerofoil positioned above the water line on the float means and adapted to house the retractile means when in retracted position, whereby the total drag is decreased and the lift increased.

7. In an airplane having a pontoon spaced an appreciable distance below the lower wings thereof for landing on water, in combination, retractable wheels for landing on a solid surface, said wheels being located on opposite sides of the pontoon, a non-retractable chassis frame for supporting said wheels, and means for raising said wheels above the water line by rotating them sidewise inwardly toward the pontoon.

8. In an airplane having a landing pontoon spaced an appreciable distance below the lower wings thereof, a landing chassis for making ground landings comprising, a rigid non-retractable chassis frame, wheel axles pivotally supported upon said rigid frame, landing wheels mounted upon said axles, and means for moving said wheels upwardly and inwardly toward each other by rotating said axles about their pivotal supports.

9. In an airplane having a landing float, a landing chassis for making ground landings, comprising a rigid chassis frame, wheel axles pivotally supported upon said rigid frame, landing wheels mounted upon said axles, and means for moving said wheels upwardly and inwardly toward each other by rotating said axles about their pivotal supports, said means including a rotatable screw having a nut travelling thereon and a link pivoted to said nut and to said wheel axle.

10. Retractable landing gear for airplanes including a non-retractable chassis frame extending an appreciable distance below the body portion of the airplane, two retractable wheel supports having fixed pivots on said chassis frame, and means for retracting said wheel supports toward said non-retractable chassis frame by rotating same about their fixed pivots, and an auxiliary lifting aerofoil secured to said non-retractable chassis frame and adapted to house said retractable wheel supports when in retracted position.

11. Retractable landing gear for airplanes including a non-retractable chassis frame, two retractable wheel supports pivotally mounted thereon, and means for retracting said wheel supports toward said non-retractable chassis frame by rotating same about their pivotal mounting inwardly and upwardly, said means including a rotatable screw having a travelling nut thereon and means connecting said nut to a wheel support.

12. In an airplane having a non-retractable chassis frame in combination, a retractable wheel support pivotally mounted upon said frame, and a rotatable screw having a travelling nut thereon, a strut having pivotal connection to said nut and wheel support at its opposite ends, and means for rotating said screw to retract said wheel support.

13. In an airplane having a retractable wheel and wheel support, a movable brace strut attached to said support at one end, a stationary guide member to which the other end of said brace strut is slidably attached, a rotatable screw extending substantially parallel with and adjacent to said guide member and having a travelling nut thereon, connecting means between said nut and the sliding end of said brace strut, and means for rotating said screw to cause said nut to move said brace strut and thereby retract the wheel and support.

In testimony whereof I thereto affix my signature.

IVAN H. DRIGGS.

Witnesses:
L. H. EMRICK,
R. K. LEE.